(12) United States Patent
Kim

(10) Patent No.: US 11,956,347 B2
(45) Date of Patent: Apr. 9, 2024

(54) METHOD AND APPARATUS WITH MOBILE PAYMENT AND VERIFICATION

(71) Applicant: SAMSUNG ELECTRONICS CO., LTD., Suwon-si (KR)

(72) Inventor: John Hongjip Kim, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 44 days.

(21) Appl. No.: 17/350,655

(22) Filed: Jun. 17, 2021

(65) Prior Publication Data

US 2021/0409195 A1    Dec. 30, 2021

(30) Foreign Application Priority Data

Jun. 30, 2020 (KR) .......... 10-2020-0080459
Feb. 8, 2021 (KR) .......... 10-2021-0017470

(51) Int. Cl.
*H04L 9/06* (2006.01)
*G06Q 20/32* (2012.01)
*G06Q 20/38* (2012.01)
*H04L 9/32* (2006.01)

(52) U.S. Cl.
CPC ......... *H04L 9/0656* (2013.01); *G06Q 20/322* (2013.01); *G06Q 20/3823* (2013.01); *G06Q 20/3829* (2013.01); *H04L 9/3239* (2013.01); *H04L 2209/56* (2013.01)

(58) Field of Classification Search
None
See application file for complete search history.

(56) References Cited

U.S. PATENT DOCUMENTS

| 8,677,144 | B2  |   | 3/2014 | Haider et al. |
| 10,402,172 | B1 | * | 9/2019 | Mandich ............... H04L 9/0858 |
| 10,558,971 | B2 |   | 2/2020 | Fontaine et al. |
| 10,949,830 | B1 | * | 3/2021 | Gaudin ............. G06Q 20/3226 |
| 11,080,387 | B1 | * | 8/2021 | Lattin ..................... G06F 21/44 |
| 2015/0142665 | A1 | * | 5/2015 | Dicker ................ G06Q 20/322 |
| | | | | 705/64 |
| 2016/0180120 | A1 |   | 6/2016 | Wallner |
| 2018/0144334 | A1 |   | 5/2018 | Fontaine et al. |
| 2018/0181964 | A1 | * | 6/2018 | Zagarese .......... G06Q 20/40145 |

(Continued)

FOREIGN PATENT DOCUMENTS

| CN | 109903028 A | 6/2019 |
| KR | 10-1510660 B1 | 4/2015 |

(Continued)

OTHER PUBLICATIONS

Wikipedia "One-time pad" https://en.wikipedia.org/wiki/One-time_pad (13 pages in English).

(Continued)

*Primary Examiner* — Scott S Trotter
*Assistant Examiner* — Amit Patel
(74) *Attorney, Agent, or Firm* — NSIP Law

(57) ABSTRACT

A processor-implemented mobile payment method includes: receiving a one-time pad (OTP) key generated based on a plurality of true random numbers; encrypting a payment token based on the OTP key; and performing a payment based on the encrypted payment token.

20 Claims, 9 Drawing Sheets

(56) References Cited

U.S. PATENT DOCUMENTS

2020/0084024 A1      3/2020   Myers
2021/0314143 A1*   10/2021   Conner ................ H04L 63/067

FOREIGN PATENT DOCUMENTS

KR        10-1721173 B1    3/2017
KR        10-1718781 B1    4/2017

OTHER PUBLICATIONS

NSIT "New Quantum Method Generates Really Random Numbers" Apr. 11, 2018, https://www.nist.gov/news-events/news/2018/04/nists-new-quantum-method-generates-really-random-numbers (4 pages in English).

Https://www.fortunebusinessinsights.com/industry-reports/mobile-payment-market-10033 Jul. 2020 (8 pages in English).

Park, Soo-Sing, "SKT expands quantum random number generator . . . Targeting autonomous vehicles and data centers," *ZDNet*. Oct. 20, 2019 (2 pages in Korean)(2 pages in English).

* cited by examiner

```
        H      E       L       L       O     Message
    7 (H)   4 (E)  11 (L)  11 (L)  14 (O)    Message
+  23 (X)  12 (M)   2 (C)  10 (K)  11 (L)    Key
=  30      16      13      21      25        Message+Key
=   4 (E)  16 (Q)  13 (N)  21 (V)  25 (Z)    (Message+Key) mod 26
        E       Q       N       V       Z   →Ciphertext
```

FIG. 6A

```
        E       Q       N       V       Z     Ciphertext
    4 (E)  16 (Q)  13 (N)  21 (V)  25 (Z)     Ciphertext
+  23 (X)  12 (M)   2 (C)  10 (K)  11 (L)     Key
= -19       4      11      11      14         Ciphertext-Key
=   7 (H)   4 (E)  11 (L)  11 (L)  14 (O)     Ciphertext-Key (mod 26)
        H       E       L       L       O    →Message
```

FIG. 6B

|   | 4 (E) | 16 (Q) | 13 (N) | 21 (V) | 25 (Z) | Ciphertext |
|---|---|---|---|---|---|---|
| + | 19 (T) | 16 (Q) | 20 (U) | 17 (R) | 8 (I) | Possible Key |
| = | -15 | 0 | -7 | 4 | 17 | Ciphertext-Key |
| = | 11 (L) | 0 (A) | 19 (T) | 4 (E) | 17 (R) | Ciphertext-Key (mod 26) |

FIG. 6C

METHOD AND APPARATUS WITH MOBILE PAYMENT AND VERIFICATION

CROSS-REFERENCE TO RELATED APPLICATIONS

This application claims the benefit under 35 USC § 119(a) of Korean Patent Application No. 10-2020-0080459 filed on Jun. 30, 2020, and Korean Patent Application No. 10-2021-0017470 filed on Feb. 8, 2021, in the Korean Intellectual Property Office, the entire disclosures of which are incorporated herein by reference for all purposes.

BACKGROUND

1. Field

The following description relates to method and apparatus with mobile payment and verification.

2. Description of Related Art

A mobile payment system may use public key cryptography encryption algorithms such as Rivest-Shamir-Adleman (RSA), elliptic curve cryptography (ECC), digital signature algorithm (DSA), and the like for security. These Public key cryptography algorithms used for encrypting the mobile payment system may be vulnerable to the quantum computer as it can factor products of two large prime numbers in $O((\log N)3)$ time and $O(\log N)$ space using "Shor's Algorithm".

The one-time pad (OTP) cryptography, developed by Gilbert Vernam in 1917, is the only known perfectly secure cryptography that guarantees unbreakable security from eavesdropping.

One-time pad cryptography is perfectly secure only if its practice meets the following four requirements: First, the encryption key must be truly random with the length of the encryption key is as long as the message for encryption. Second, the encryption key must be used only once for encrypting the message. Third, a user must transmit the unused encryption key to a different user using the channel or method that completely hides the unused encryption key from the attacker. Fourth, the used encryption key must remain secret or disposed of correctly, preventing any reuse in whole or in part.

Although One-time Pad Cryptography provides perfect secrecy of the data from eavesdropping, it doesn't protect the integrity of the encrypted data during the transmission. The attacker may intercept the encrypted data, make modification of the encrypted data by changing a portion of encrypted data, and retransmit the modified encrypted data to the intended recipient. The intended recipient could decrypt the modified encrypted message using correct one time pad key, but won't know if the message has been tampered using traditional One Time Pad cryptography.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented mobile payment method includes: receiving a one-time pad (OTP) key generated based on a plurality of true random numbers; encrypting payment data based on the OTP key as payment token; and performing a payment based on the encrypted payment data.

The plurality of true random numbers may be generated by a quantum random number generator.

The method may include decrypting the OTP key.

The payment data may include any one or any combination of any two or more of a transaction identification (ID), a card number, an expiration date, a purchase date and time, a seller, a purchased item, a payment amount, a card verification code (CVC), an address of a buyer, and a nonce value corresponding to the payment data.

The encrypting may include: generating a hash value by applying a hash function to the payment data; and encrypting the payment data and the hash value using the OTP key.

The hash function may be Secure Hash Algorithm-3 (SHA-3).

The encrypting of the payment data and the hash value using the OTP key may include: concatenating the payment data with the hash value; and performing OTP encryption on the concatenated payment data and the hash value using the OTP key.

The method may include: generating the OTP key based on the plurality of true random numbers; and verifying a validity and integrity of the payment using the OTP key and the encrypted payment data with the encrypted hash value.

A non-transitory computer-readable storage medium may store instructions that, when executed by a processor, configure the processor to perform the method.

In another general aspect, a mobile payment apparatus includes: a receiver configured to receive an OTP key generated based on a plurality of true random numbers; and a processor configured to: encrypt payment data using the OTP key; and perform a payment based on the encrypted payment data.

The plurality of true random numbers may be generated by a quantum random number generator.

The processor may be configured to decrypt the OTP-encrypted payment data.

The payment data may include any one or any combination of any two or more of a transaction ID, a card number, an expiration date, a purchase date and time, a seller, a purchased item, a payment amount, a CVC, an address of a buyer, and a nonce value corresponding to the payment data.

For the encrypting, the processor may be configured to: generate a hash value by applying a hash function to the payment data; and encrypt the payment data and the hash value based on the OTP key.

For the encrypting of the payment data and the hash value using the OTP key, the processor may be configured to: concatenate the payment data with the hash value; and perform OTP encryption on the concatenated payment data and hash value using the OTP key.

In another general aspect, a processor-implemented mobile payment method includes: receiving a plurality of true random numbers; generating an OTP key based on the plurality of true random numbers; receiving payment data encrypted using the OTP key; and verifying either one or both of validity and integrity of a mobile payment based on the OTP key and the encrypted payment data.

The plurality of true random numbers may be generated by a quantum random number generator.

The encrypted payment data may include any one or any combination of any two or more of encrypted transaction ID, card number, expiration date, purchase date and time, seller, purchased item, payment amount, CVC, address of a buyer, and a nonce value corresponding to the payment data. The encrypted payment data may also further include the hash value of the aforementioned payment data concatenated to the payment data.

The verifying may include: decrypting the encrypted payment data based on the OTP key; and verifying either one or both of the validity and the integrity of the mobile payment based on the decrypted payment data.

The decrypting may include obtaining the decrypted payment data and the decrypted hash value of the payment data by decrypting the encrypted payment data based on the OTP key.

The verifying of validity or integrity of the mobile payment based on the decrypted payment data may include: generating a newly generated hash value by applying a hash function such as SHA-3 to the decrypted payment data without the concatenated hash; and verifying either one or both of the validity and the integrity of the mobile payment by comparing the newly generated hash value and the decrypted hash value.

The verifying may include determining whether the nonce value is unique.

The method may include encrypting the OTP key.

In another general aspect, a processor-implemented mobile payment method includes: generating an OTP key based on a plurality of true random numbers; determining the hash value by decrypting an encrypted payment data based on the generated OTP key; generating a newly generated hash value by applying a hash function to the decrypted payment data without the concatenated hash; and verifying a mobile payment by comparing the newly generated hash value and the decrypted hash value.

The method may include encrypting and transmitting the generated OTP key.

The method may include receiving the encrypted payment data, wherein the encrypted payment data is encrypted based on the transmitted OTP key.

Other features and aspects will be apparent from the following detailed description, the drawings, and the claims.

BRIEF DESCRIPTION OF THE DRAWINGS

FIG. 6A illustrates an example of performing encryption using an OTP key.

FIG. 6B illustrates an example of performing decryption using an OTP key.

FIG. 6C illustrates an example of an attack on an encrypted ciphertext with an OTP key by an attacker.

Figure 1:
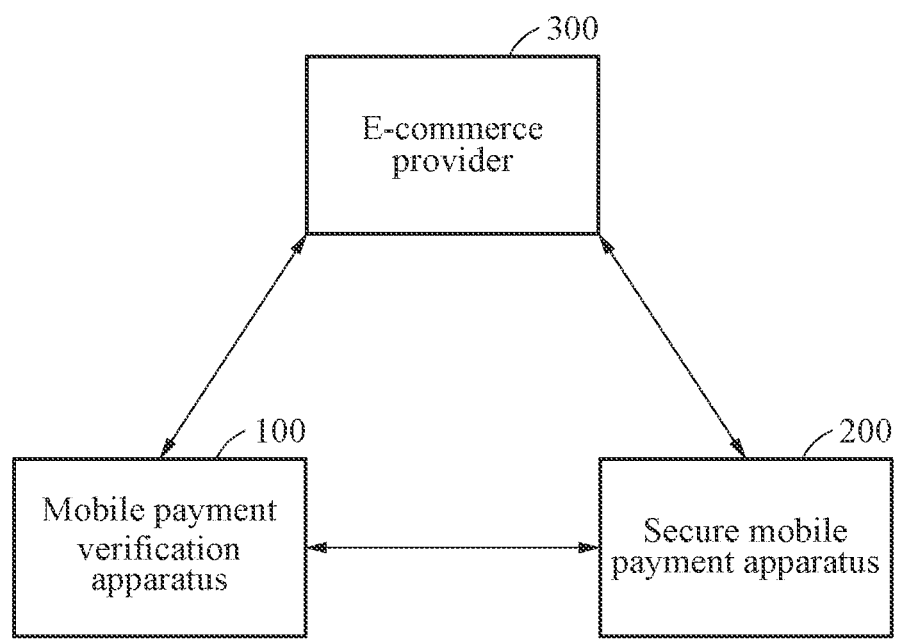
FIG. 1 illustrates an example of a mobile payment system.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

In addition, terms such as first, second, A, B, (a), (b), and the like may be used herein to describe components according to example embodiments. Each of these terminologies is not used to define an essence, order, or sequence of a corresponding component but used merely to distinguish the corresponding component from other component(s). Although terms of "first" or "second" are used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

Also, in the description of example embodiments, detailed description of structures or functions that are thereby known after an understanding of the disclosure of the present application may be omitted when it is deemed that such description may cause ambiguous interpretation of the example embodiments.

Hereinafter, examples will be described in detail with reference to the accompanying drawings, and like reference numerals in the drawings refer to like elements throughout.

Figure 2:
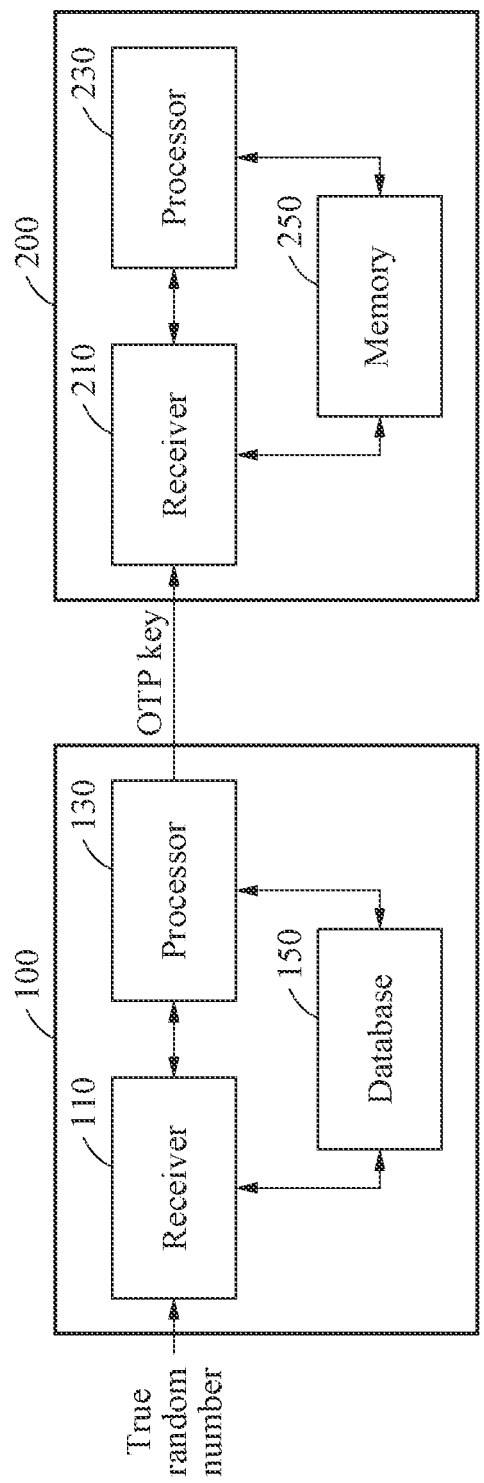
FIG. 2 illustrates an example of a mobile payment verification apparatus and a secure mobile payment apparatus.

FIG. 1 illustrates an example of a mobile payment system. FIG. 2 illustrates an example of a mobile payment verification apparatus and a secure mobile payment apparatus (e.g., a mobile payment verification apparatus and a secure mobile payment apparatus illustrated in FIG. 1). There may be no way to detect the validity of a payment with a typical OTP, even when an intermediate attacker with malicious intent modifies a part of an encrypted message. In contrast, for desired secure mobile payment, a mobile payment verification apparatus and a secure mobile payment apparatus of one or more embodiments may guarantee both validity and integrity. Also, for desired secure mobile payment, the mobile payment verification apparatus and the secure mobile payment apparatus of one or more embodiments may prevent a replay attack by an intermediate attacker reusing an already used payment token.

Referring to FIGS. 1 and 2, a mobile payment verification apparatus 100 may perform verification on a mobile payment. The mobile payment verification apparatus 100 may perform verification on a payment request received from an e-commerce provider 300. In a non-limiting example of FIG. 2, a mobile payment apparatus of one or more embodiments includes both the mobile payment verification apparatus 100 and the secure mobile payment apparatus 200.

The mobile payment verification apparatus 100 may generate a one-time pad (OTP) key based on a true random number and transmit the OTP key to a secure mobile payment apparatus 200.

The secure mobile payment apparatus 200 may perform a transaction with the e-commerce provider 300 using the OTP key. For example, the secure mobile payment apparatus 200 may transmit an encrypted payment token to the e-commerce provider 300 using the OTP key. The e-commerce provider 300 may request verification by transmitting the encrypted payment token to the mobile payment verification apparatus 100.

The e-commerce provider 300 may be a subject that receives a payment amount from a user of the secure mobile payment apparatus 200 and that provides goods or services in return for the received payment amount, and the e-commerce provider 300 may include a subject that provides goods or services corresponding to a payment online or offline, not being limited to a subject that sells goods on the Internet.

For example, the e-commerce provider 300 may include an online-based e-commerce company, a department store, and/or a restaurant.

The secure mobile payment apparatus 200 may perform a payment while maintaining security for a payment token using OTP and a hash.

The secure mobile payment apparatus 200 may be, or may be included in, a mobile terminal. For example, the secure mobile payment apparatus 200 may be, or may be included in, an Internet of Things (IoT) device, a machine-type communications device, a portable electronic device, and/or the like.

The portable electronic device may be, or may be included in, a laptop computer, a mobile phone, a smart phone, a tablet personal computer (PC), a mobile Internet device (MID), a personal digital assistant (PDA), an enterprise digital assistant (EDA), a digital still camera, a digital video camera, a portable multimedia player (PMP), a personal or portable navigation device (PND), a handheld game console, an e-book, and/or a smart device. For example, the smart device may be, or may be included in, a smart watch or a smart band.

Referring to FIG. 2, the mobile payment verification apparatus 100 may include a receiver 110, a processor 130 (e.g., one or more processors), and a database 150. The secure mobile payment apparatus 200 may include a receiver 210, a processor 230 (e.g., one or more processors), and a memory 250 (e.g., one or more memories).

The receiver 110 may include a receiving interface. The receiver 110 may receive a plurality of true random numbers. The true random numbers may be generated by a quantum random number generator. The quantum random number generator may be implemented outside or inside and included in the mobile payment verification apparatus 100 (e.g., included in the processor 130).

The receiver 110 may receive a payment token encrypted based on an OTP key. The encrypted payment token may include encrypted transaction identification (ID), card number (e.g., credit card number), expiration date (e.g., card expiration date), purchase date and time, seller, purchased item, payment amount, and/or a nonce value corresponding to the payment token. The nonce value may indicate a unique number corresponding to the payment token. The encrypted payment token may also include the hash of the aforementioned payment data, and the nonce value concatenated to the payment data and the nonce value.

The receiver 110 may output the received true random numbers and/or the encrypted payment token to the processor 130.

The processor, for example, the processor 130 and the processor 230, may process data respectively stored in the database 150 or the memory 250. The processor, for example, the processor 130 and the processor 230, may execute a computer-readable code (e.g., software) respectively stored in the database 150 or the memory 250, or instructions induced by the processor.

The processor, for example, the processor 130 and the processor 230, may be a data processing device implemented as hardware that has a circuit of a physical structure for executing desired operations. For example, the desired operations may include instructions or a code in a program.

For example, the data processing device implemented as hardware may include a microprocessor, a central processing unit (CPU), a processor core, a multi-core processor, a multiprocessor, an application-specific integrated circuit (ASIC), and/or a field-programmable gate array (FPGA).

The processor 130 may generate the OTP key based on the true random numbers. The processor 130 may encrypt the OTP key. The processor 130 may transmit the OTP key or the encrypted OTP key to the secure mobile payment apparatus 200. The processor 130 may transmit the OTP key or the encrypted OTP key to a user of the secure mobile payment apparatus 200 using a separate storage medium. A non-limiting example of the storage medium will be described in further detail hereinafter with reference to FIG. 3.

The processor 130 may verify the validity or integrity of a mobile payment based on the OTP key and the encrypted payment token.

The processor 130 may decrypt the encrypted payment token based on the OTP key. The processor 130 may obtain the payment data and the hash value by decrypting the encrypted payment token using the OTP key.

The processor 130 may verify the validity or integrity of the mobile payment based on the decrypted payment token. For example, the processor 130 may generate a new hash value by applying a hash function to the portion of the decrypted payment token without the decrypted hash value concatenated with the decrypted payment data. The processor 130 may verify the validity or integrity of the mobile payment by comparing the hash value included in the decrypted payment token and the new hash value.

The processor 130 may determine whether the nonce value is unique. The processor 130 may determine whether the nonce value is unique to prevent a replay attack.

For example, the processor 130 of one or more embodiments may determine whether the nonce value is unique to prevent a situation where the e-commerce provider 300 with malicious intent steals a customer's asset by repeatedly transmitting the same payment token at least twice to the mobile payment verification apparatus 100.

The database 150 may store the OTP key generated based on the received true random numbers or a true random number. The processor 130 may perform verification by loading the OTP key from the database 150 whenever verification of a payment is required.

The receiver 210 may include a receiving interface. The receiver 210 may receive the OTP key generated based on the true random numbers. The receiver 210 may output the OTP key to the processor 230. The true random numbers may be generated by a quantum random number generator.

The OTP key received by the receiver 210 may be in an encrypted state. For example, the OTP key may be encrypted with an advanced encryption standard (AES) technique.

When the OTP key is encrypted, the processor 230 may decrypt the encrypted OTP key. For example, the processor 230 may decrypt the AES encrypted OTP key.

The processor 230 may encrypt the payment data and the hash value using the OTP key. The payment data may include a transaction ID, a card number, an expiration date, a purchase date and time, a seller, a purchased item, a payment amount, or a nonce value corresponding to the payment data.

The processor 230 may generate the hash value by applying the hash function to the payment data. The processor 230 may encrypt the payment data and the hash value using the OTP key.

The processor 230 may concatenate the payment data with the hash value. The processor 230 may perform OTP encryption on the concatenated payment data and the hash value using the OTP key as the encrypted payment token. In an example, both the payment data and the hash value must be encrypted using One Time Pad cryptography to become the payment token. Users may exchange the payment token that comprises of both OTP encrypted payment data and OTP encrypted hash to a commerce provider as payment for service or good from the commerce provider.

The processor 230 may perform the payment based on the encrypted payment token.

The memory 250 may store instructions (or a program) executable by the processor 230. For example, instructions may include instructions for executing an operation of a processor and/or instructions for performing an operation of each component of the processor.

The memory 250 may be or include a volatile memory device or a non-volatile memory device.

The volatile memory device may be a dynamic random-access memory (DRAM), a static RAM (SRAM), a thyristor RAM (T-RAM), a zero capacitor RAM (Z-RAM), and/or a twin transistor RAM (TTRAM).

The non-volatile memory device may be an electrically erasable programmable read-only memory (EEPROM), a flash memory, a magnetic RAM (MRAM), a spin-transfer torque-MRAM (STT-MRAM), a conductive bridging RAM (CBRAM), a ferroelectric RAM (FeRAM), a phase change RAM (PRAM), a resistive RAM (RRAM), a nanotube RRAM, a polymer RAM (PoRAM), a nano-floating gate memory (NFGM), a holographic memory, a molecular electronic memory device, or an insulator resistance change memory.

Figure 3:
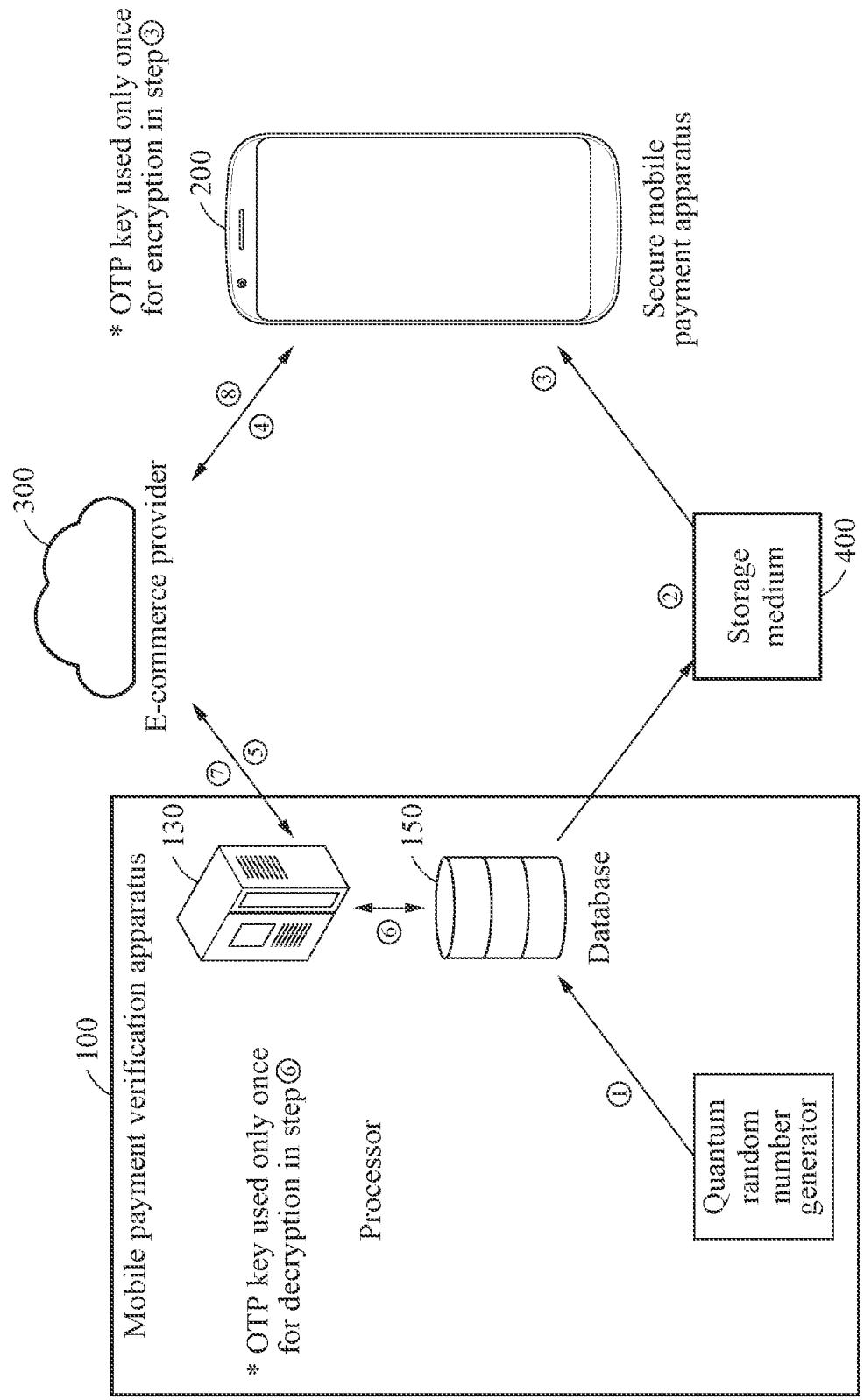
FIG. 3 illustrates an example of an operation of a mobile payment system.

FIG. 3 illustrates an example of an operation of a mobile payment system illustrated (e.g., the mobile payment system illustrated in FIG. 1).

Referring to FIG. 3, the mobile payment system may provide security for a payment using a hash function and an OTP key based on a true random number. The mobile payment system of one or more embodiments may prevent eavesdropping and unauthorized tampering of data that is being transmitted.

The mobile payment system of one or more embodiments may improve a security level for a mobile payment by discarding an OTP key after using it only once. The mobile payment system of one or more embodiments may generate the OTP key using a true random number and may thus provide security for a payment token against an attack made using a quantum computer.

The processor 130 may receive a plurality of true random numbers from a quantum random number generator. The processor 130 may generate an OTP key based on the true random numbers. The processor 130 may store the generated OTP key in the database 150.

The processor 130 may encrypt the OTP key. For example, the processor 130 may encrypt the OTP key with an AES 256 encryption. The AES 256 encryption may use a 32-byte long unique password.

The processor 130 may transmit the generated OTP key to the secure mobile payment apparatus 200. The OTP key may be transmitted to the secure mobile payment apparatus 200 through a separate storage medium 400. For example, the storage medium 400 may include a secure digital (SD) card.

The storage medium 400 may store an OTP key encrypted with a password of an arbitrary length for each user. For example, the OTP key may be encrypted with a 16-byte or 32-byte long password.

In response to an attacker stealing and copying the storage medium 400, a cloning protection may be set for the storage medium 400.

The processor 230 of the secure mobile payment apparatus 200 may encrypt a payment data and its hash value using the OTP key received from the processor 230. The processor 230 may use the payment data and its hash value encrypted with the OTP key to perform a payment with the e-commerce provider 300.

The processor 230 may decrypt the encrypted OTP key stored in the storage medium 400. When the encrypted OTP key is not decrypted with a correct password, the storage medium 400 may delete the stored OTP key for security. For example, when a password to decrypt the encrypted OTP key is incorrect ten times, the storage medium 400 may completely delete the stored encrypted OTP key.

Alternatively, a separate processor included in an SD card (e.g., NAND flash memory controller) may delete the stored OTP key. For example, when an attacker inputs an incorrect password at least ten times to decrypt the encrypted OTP key in the SD card, the separate processor in the SD card may delete the encrypted OTP key.

Deleting the encrypted OTP key in the SD card by detecting an incorrectly input password may discourage an attacker from decrypting the encrypted OTP key using a brute-force attack while invading or compromising the storage medium 400.

As another example of safe decryption of the encrypted OTP key, a user of the secure mobile payment apparatus 200 may call an authorized staff or an administrator of the mobile payment verification apparatus 100 for the decryption.

The processor 230 may delete the OTP key after using the OTP key once. When the OTP keys received through the storage medium 400 are all used or about to be used, the processor 230 may request a new OTP key from the mobile payment verification apparatus 100.

The processor 230 may use the OTP key received from the storage medium 400 for years because the size of the payment data and the hash value to be encrypted using the OTP key is not large (e.g., approximately 100 to 200 bytes).

For example, when one user has 20 transactions a day for 365 days, and one transaction requires a 150-byte long OTP key, an OTP key of less than or equal to 1.1 megabytes (MB) may be used for a year.

In this example, when there are 1 million OTP key users, the database 150 of 3.3 terabytes (TB) may be needed to cover 1 million OTP key users for three years' use. Similarly, the database 150 of a 33 TB may be needed to cover 10 million users for three years' use.

The e-commerce provider 300 may transmit the payment token received from the secure mobile payment apparatus 200 to the mobile payment verification apparatus 100. The mobile payment verification apparatus 100 may verify the payment token encrypted by the OTP key and transmit the result of verifying the payment token to the e-commerce provider 300.

The e-commerce provider 300 may provide a product to the user of the secure mobile payment apparatus 200 according to such a verification result.

Figure 4:
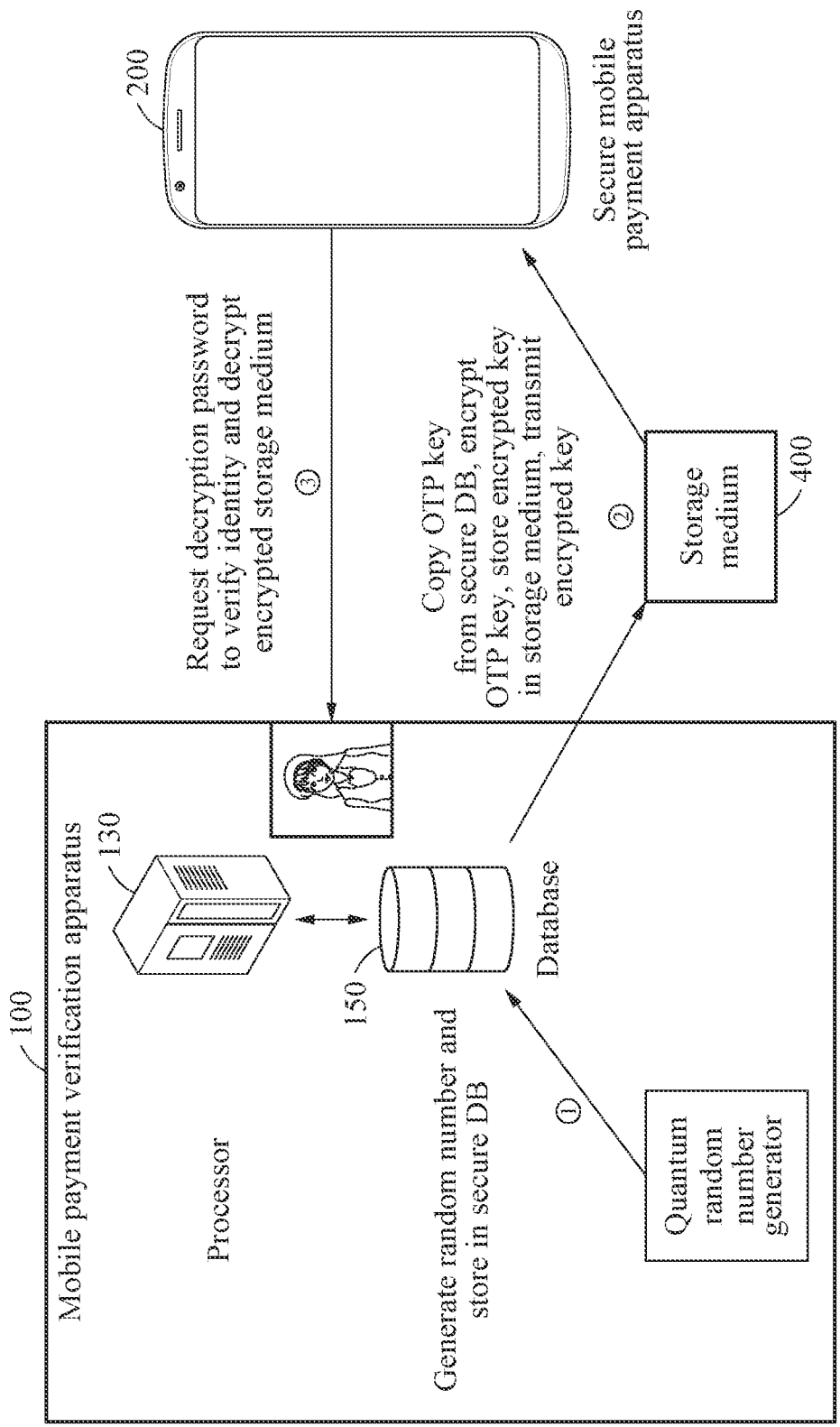
FIG. 4 illustrates an example of transmitting a one-time pad (OTP) key from a mobile payment verification apparatus to a secure mobile payment apparatus.

FIG. 4 illustrates an example of transmitting an OTP key from a mobile payment verification apparatus (e.g., the mobile payment verification apparatus 100 illustrated in FIG. 1) to a secure mobile payment apparatus (e.g., the secure mobile payment apparatus 200 illustrated in FIG. 1).

The mobile payment verification apparatus 100 may be used by a payment transaction clearing house. The payment transaction clearing house may include a financial institution and/or a communications provider.

The processor 130 may receive a true random number from a quantum random number generator and store the received true random number in the database 150. The processor 130 may generate an OTP key based on the true random number. The processor 130 may generate two copies A and B of the OTP key, store copy A into the database 150, encrypt copy B using AES encryption, and store encrypted copy B in storage medium 400.

The processor 130 may also copy the OTP key from the database 150, encrypt the copy of the OTP key, and store the encrypted OTP key in the storage medium 400. The processor 130 may transmit the encrypted OTP key in the storage medium 400 to the secure mobile payment apparatus 200. For example, the processor 130 may encrypt the OTP key with the AES 256 encryption.

For example, the processor 130 may encrypt copy B of the OTP key, store the encrypted copy in the storage medium 400, and then transmit the encrypted copy B to the secure mobile payment apparatus 200 or a user of the secure mobile payment apparatus 200. Here, the storage medium 400 may be sent to the user of the secure mobile payment apparatus 200 by mail, or stored in advance when the secure mobile payment apparatus 200 is manufactured.

When the processor 230 of the secure mobile payment apparatus 200 receives an encrypted OTP key stored in the storage medium 400 for the first time, the processor 230 may decrypt the encrypted OTP key. For example, the processor 230 may verify the identity of the user of the secure mobile payment apparatus 200 with the mobile payment verification apparatus 100, and receive a password for decryption.

For example, the processor 230 may verify the identity of the user by providing a social security number, a birthday, an address, or other personal information of the user to the mobile payment verification apparatus 100. The processor 230 may decrypt the encrypted copy A using the password provided by the mobile payment verification apparatus 100 using the AES 256 technique.

Figure 5:
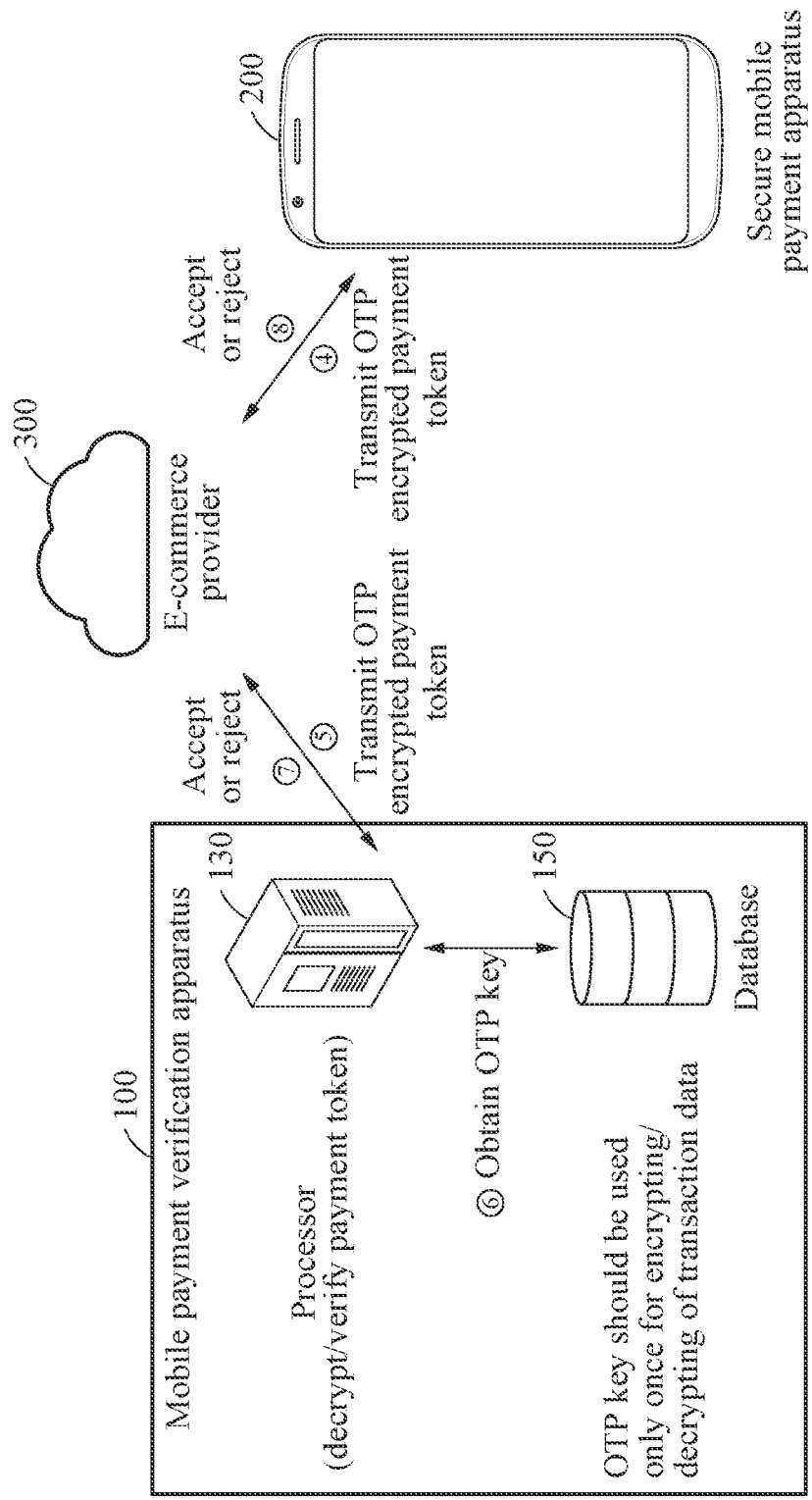
FIG. 5 illustrates an example of a payment by a secure mobile payment apparatus.

FIG. 5 illustrates an example of a payment by a secure mobile payment apparatus (e.g., the secure mobile payment apparatus 200 illustrated in FIG. 1).

Referring to FIG. 5, the secure mobile payment apparatus 200 may perform a transaction with the e-commerce provider 300 using an OTP key. The secure mobile payment apparatus 200 may perform a payment using an OTP key.

In an example, the receiver 210 may receive an OTP key generated based on a plurality of true random numbers from the mobile payment verification apparatus 100. The processor 230 may encrypt a payment data based on the OTP key and perform a payment based on the encrypted payment token.

The processor 230 may generate a hash value by applying a hash function to the payment data, and encrypt the payment data and the hash value using the OTP key. For example, the processor 230 may obtain the hash value of the payment data using Secure Hash Algorithm-3 (SHA-3).

The processor 230 may guarantee the integrity of the payment token using the hash value.

The processor 230 may concatenate the hash value and the payment data, and perform OTP encryption on the payment data concatenated with the hash value using the OTP key.

For example, the secure mobile payment apparatus 200 may use the copy B for the OTP encryption of the payment data and the hash value of the payment token and use the encrypted one obtained by the OTP encryption for a payment to the e-commerce provider 300. The e-commerce provider 300 may receive the payment token encrypted with the copy B from the processor 230, and transmit the received payment token to the mobile payment verification apparatus 100. The mobile payment verification apparatus 100 may then use copy A to decrypt the encrypted payment token and verify the validity or integrity of the payment data.

The processor 130 may decrypt the encrypted payment token based on the OTP key. The processor 130 may verify the validity or integrity of the mobile payment based on the decrypted payment data.

The processor 130 may apply the hash function on the payment data to generate a new hash value. The processor 130 may verify the validity or integrity of the mobile payment by comparing the hash value that was concatenated with the hash data in the decrypted payment token and the new hash value. If the values are the same, then the mobile payment is valid and the integrity is verified.

In addition, the processor 130 may verify the uniqueness of a nonce value included in the payment token. When the nonce value is unique and the same nonce is not used for any previous transaction, and the hash value concatenated with the payment data included in the decrypted payment token is the same as the verified hash value, the validity and integrity of the payment may be determined or ensured. That is, the processor 130 may verify whether the nonce value is unique, and determine the validity of the payment token by verifying that the same payment token has not been used before this transaction.

The processor 130 may verify the uniqueness of the nonce value and prevent a replay attack.

The mobile payment verification apparatus 100 may verify the validity or integrity of the payment token, and transmit a verification result to the e-commerce provider 300.

FIG. 6A illustrates an example of performing encryption using an OTP key. FIG. 6B illustrates an example of performing decryption using an OTP key. FIG. 6C illustrates an example of an attack on an encrypted ciphertext with an OTP key by an attacker.

Referring to FIGS. 6A through 6C, the processor 230 may encrypt a payment token using an OTP key (e.g., copy A). For example, when encrypting characters HELLO using an OTP key as illustrated in FIG. 6A, the processor 230 may perform encryption using an OTP key, for example, XMCKL, based on true random numbers.

The processor 230 may add a number corresponding to each alphabet included in HELLO and a number corresponding to the OTP key, and generate a ciphertext (e.g., OTP encrypted payment token) with a modulo operation.

The processor 230 may calculate sums 30, 16, 13, 21, and 25 of the message (or HELLO) and the OTP key by adding the numbers 7, 4, 11, 11, and 14 respectively corresponding to alphabets of HELLO and the numbers 23, 12, 2, 10, and 11 respectively corresponding to XMCKL which is the OTP key.

Subsequently, the processor 230 may perform a modulo 26 operation to obtain numbers 4, 16, 13, 21, and 25, and obtain, as the ciphertext, alphabets EQNVZ corresponding to the obtained numbers.

The processor 130 of the mobile payment verification apparatus 100 may decrypt the OTP encrypted payment token. An original message may be obtained as described with reference to FIG. 6B by decrypting the ciphertext generated as described above with reference to FIG. 6A.

The processor 130 may decrypt the ciphertext EQNVZ using the OTP key (e.g., copy B). The processor 130 may obtain −19, 4, 11, 11, and 14 by subtracting the numbers 23, 12, 2, 10, and 11 respectively corresponding to the ciphertext EQNVZ. The processor 230 may perform the modulo 26 operation to decrypt, to the original message, the alphabets HELLO respectively corresponding to the numbers 7, 4, 11, 11, and 14.

When an attacker attempts to decrypt a ciphertext without a correct OTP key, a correct original message may not be obtained, which may safely protect a payment token.

Figure 7:
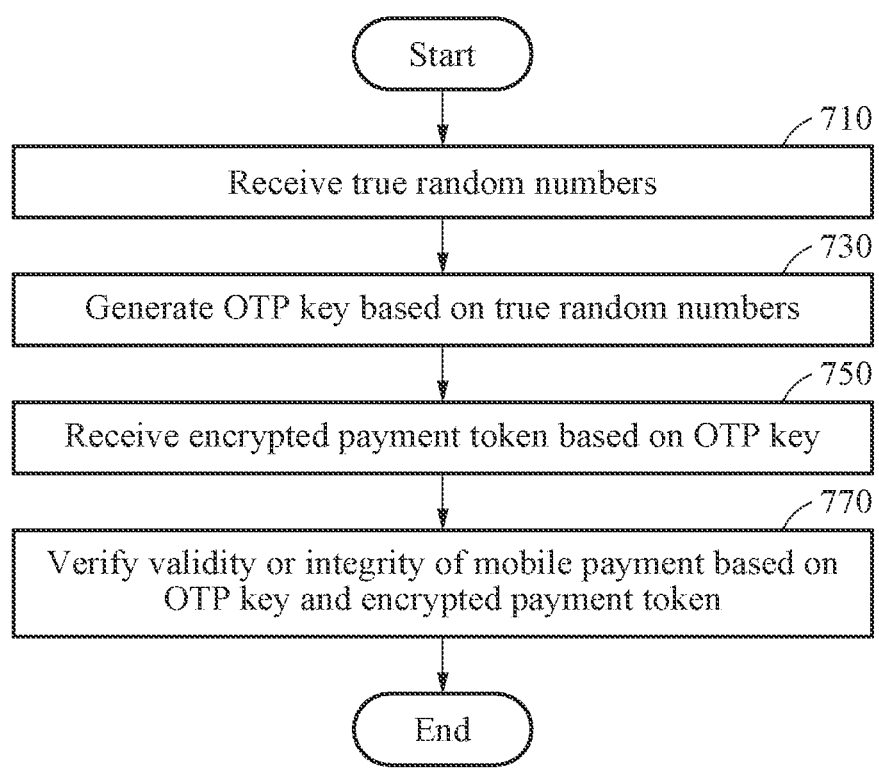
FIG. 7 illustrates an example of an operation of a mobile payment verification apparatus.

FIG. 7 illustrates an example of an operation of a mobile payment verification apparatus (e.g., the mobile payment verification apparatus 100 illustrated in FIG. 1).

Referring to FIG. 7, the receiver 110 may receive a plurality of true random numbers in operation 710. For example, the plurality of true random numbers may be generated by a quantum random number generator.

The processor 130 may generate an OTP key based on the true random numbers in operation 730. The processor 130 may encrypt the generated OTP key.

The receiver 110 may receive a payment token encrypted based on the OTP key in operation 750. The encrypted payment token may include the encrypted payment data that includes transaction ID, card number, expiration date, purchase date and time, seller, purchased item, payment amount, CVC, buyer's address, a nonce value, and the hash of the encrypted payment data.

The processor 130 may verify the validity or integrity of a mobile payment based on the OTP key and the encrypted payment token in operation 770. The processor 130 may decrypt the encrypted payment token based on the OTP key.

The processor 130 may obtain the payment data and a hash value of the payment token by decrypting the encrypted payment token based on the OTP key.

The processor 130 may verify the validity or integrity of the mobile payment based on the decrypted payment data. The processor 130 may generate a verified hash value by applying a hash function to the payment data. The processor 130 may verify the validity or integrity of the mobile payment by comparing the hash value and the verified hash value and by confirming that the hash values are the same.

The processor 130 may determine whether the nonce value in the payment data is unique and has not been used in the previous transaction.

Figure 8:
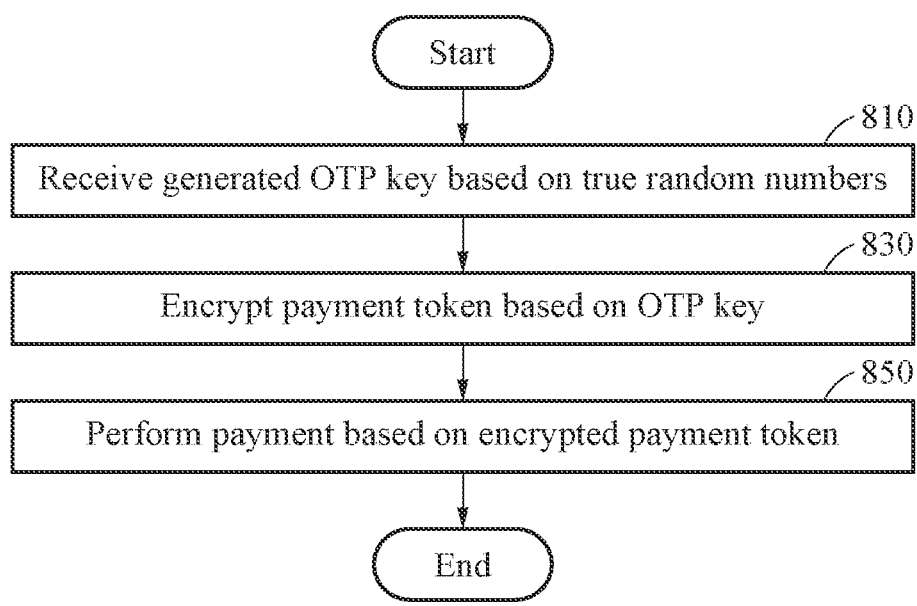
FIG. 8 illustrates an example of an operation of a secure mobile payment apparatus.

FIG. 8 illustrates an example of an operation of a secure mobile payment apparatus (e.g., the secure mobile payment apparatus 200 illustrated in FIG. 1).

Referring to FIG. 8, the receiver 210 may receive an OTP key generated based on a plurality of true random numbers in operation 810. For example, the plurality of true random numbers may be generated by a quantum random number generator. When the OTP key is encrypted, the processor 230 may decrypt the OTP key.

The processor 230 may encrypt a payment data based on the OTP key in operation 830. The payment data may include a transaction ID, a card number, an expiration date, a purchase date and time, seller information, a purchased item, a payment amount, or a nonce value corresponding to the payment token.

The processor 230 may generate a hash value by applying a hash function to the payment data and concatenate the payment data with the hash value. The processor 230 may encrypt the payment data and the concatenated hash value based on the OTP key.

The processor 230 may concatenate the hash value and the payment data. The processor 230 may perform OTP encryption on the concatenated hash value and payment token based on the OTP key.

The processor 230 performs a payment based on the encrypted payment token in operation 850.

The mobile payment verification apparatuses, secure mobile payment apparatuses, e-commerce providers, receivers, processors, databases, memories, storage mediums, mobile payment verification apparatus 100, secure mobile payment apparatus 200, e-commerce provider 300, receiver 110, processor 130, database 150, receiver 210, processor 230, memory 250, storage medium 400, and other apparatuses, devices, units, modules, and components described herein with respect to FIGS. 1-8 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A processor-implemented mobile payment method performed, by one or more processors of an electronic device, the method comprising:
   generating, corresponding to a cryptography original one-time pad (OTP) key that is based on a plurality of true random numbers, a decrypted OTP key by decrypting a received encrypted OTP key for representing an encryption result of the original OTP key;
   generating a first cryptographic hash by applying a cryptographic hash function to payment data corresponding to a current payment transaction between the electronic device and a commerce device, wherein the cryptographic hash function is configured to generate the first cryptographic hash to be uniquely representative of the payment data for guaranteeing an integrity of the payment data;
   generating an encrypted payment token by encrypting the payment data concatenated with the first cryptographic hash using the decrypted OTP key, and transmitting the encrypted payment token to the commerce device; and
   selectively, based on a decrypted portion of the encrypted payment token corresponding to the first cryptographic hash and a decrypted different portion of the encrypted payment token corresponding to the encrypted payment data using the original OTP key, confirming a payment of the current payment transaction to the commerce device, including:
      receiving verification information representing whether a first decryption result matches a second cryptographic hash generated from a second decryption result using the cryptographic hash function, for confirming whether the integrity of the payment data is guaranteed;
      confirming the payment when the received verification information represents that the first decryption result matches a second hash value and that the integrity of the payment data is guaranteed; and
      not confirming the payment when the received verification information represents that the first decryption result does not match the second hash value and the integrity of the payment data is not guaranteed.

2. The method of claim 1, wherein the plurality of true random numbers is generated by a quantum random number generator of a verification device or system that generates the original OTP.

3. The method of claim 1, wherein the payment data comprises any one or any combination of any two or more of a transaction identification (ID), a card number, an expiration date, a purchase date and time, a seller, a purchased item, a payment amount, a card verification code (CVC), and an address of a buyer.

4. The method of claim 1,
   wherein the payment data further comprises a unique nonce value corresponding to the payment data, and
   wherein the selective confirming of the payment further comprises only confirming the payment when a decrypted nonce value from the encrypted payment token has not previously been utilize in a commerce transaction.

5. The method of claim 4, wherein the cryptographic hash function is Secure Hash Algorithm-3 (SHA-3).

6. A non-transitory computer-readable storage medium storing instructions that, when executed by a processor, configure the processor to perform the method of claim 1.

7. A mobile payment apparatus comprising:
   one or more processors configured to:
   generate, corresponding to a cryptography original one-time pad (OTP) key that is based on a plurality of true random numbers, a decrypted OTP key through decryption of a received encrypted OTP for representing an encryption result of the original OTP key;
   generate a first cryptographic hash through application of a cryptographic hash function to payment data corresponding to a current payment transaction between an electronic device and a commerce device, wherein the cryptographic hash function is configured to generate the first cryptographic hash to be uniquely representative of the payment data for guaranteeing an integrity of the payment data;
   generate an encrypted payment token through encryption of the payment data concatenated with the first cryptographic hash using the decrypted OTP key, and control transmission of the encrypted payment token to the commerce device; and
   selectively based on a decrypted different portion of the encrypted payment token corresponding to the first cryptographic hash and a decrypted different portion of the encrypted payment token, corresponding to the encrypted payment data using the original OTP key, confirm a payment of the current payment transaction to the commerce device, including:
      receive verification information representing whether a first decryption result matches a second cryptographic hash generated from a second decryption result using the cryptographic hash function, for confirming whether the integrity of the payment data is guaranteed;
      confirm the payment when the received verification information represents that the first decryption result matches a second hash value and that the integrity of the payment data is guaranteed; and
      not confirm the payment when the received verification information represents that the first decryption result does not match the second hash value and the integrity of the payment data is not guaranteed.

8. The apparatus of claim 7, wherein the plurality of true random numbers is generated by a quantum random number generator.

9. The apparatus of claim 7, wherein the payment data comprises any one or any combination of any two or more of a transaction ID, a card number, an expiration date, a purchase date and time, a seller, a purchased item, a payment amount, a CVC, and an address of a buyer.

10. The apparatus of claim 7,
wherein the payment data further comprises a unique nonce value corresponding to the payment data, and
wherein, for the selective confirming of the payment, the one or more processors are further configured to only confirm the payment when a decrypted nonce value from the encrypted payment token has not previously been utilized in a commerce transaction.

11. A processor-implemented mobile payment method, the method comprising:
generating a cryptography original one-time pad (OTP) key based on a plurality of true random numbers, and encrypting the original OTP;
receiving an encrypted payment token, representative of payment data concatenated with a first cryptographic hash encrypted by an electronic device according to a decrypted OTP corresponding to the encrypted original OTP, where the payment data corresponds to a current payment transaction between the electronic device and a commerce device;
decrypting the encrypted payment token using the original OTP key to obtain decrypted payment data from a portion of the payment token corresponding to encrypted payment data and a decrypted first cryptographic hash from a different portion of the payment token corresponding to the encrypted first cryptographic hash, where the decrypted first cryptographic hash is representative of whether an integrity of the payment ta is guaranteed;
generating a second cryptographic hash by applying a cryptographic hash function to the decrypted payment data, wherein the cryptographic hash function is configured to generate the second cryptographic hash to be uniquely representative of the decrypted payment data; and
determining whether one or both of a validity and an integrity of the decrypted payment data is confirmed based on whether the second cryptographic hash matches the decrypted first cryptographic hash;
transmitting verification information to the commerce device indicating that the one or both of the validity and the integrity of the decrypted payment data is confirmed, representing that the decrypted first cryptographic hash matches the second cryptographic hash, when a result of the determining is that the decrypted first cryptographic hash matches the second cryptographic, for a confirming of a payment of the current payment transaction by the electronic, device or the commerce device; and
transmitting the verification information to the commerce device indicating that the one or both of validity and the integrity of the decrypted payment data is not confirmed, representing that the decrypted first cryptographic hash does not match the second cryptograph hash, when the result of the determining is that the decrypted first cryptographic hash does not match the second cryptographic hash, for a non-confirming of the payment of the current payment transaction by the electronic devise or the commerce device.

12. The method of claim 11, wherein the plurality of true random numbers is generated by a quantum random number generator.

13. The method of claim 11, wherein the encrypted payment data comprises any one or any combination of any two or more of encrypted transaction ID, card number, expiration date, purchase date and time, seller, purchased item, payment amount, CVC, and address of a buyer.

14. The method of claim 11, wherein the encrypted payment data further comprises a nonce value corresponding to the payment data.

15. The method of claim 13, wherein the determining of whether the one or both of the validity and the integrity of the decrypted payment data is confirmed comprises only determining that the one or both of the validity and the integrity of the decrypted payment data is confirmed when a decrypted nonce value from the encrypted payment token has not previously been utilized in a commerce transaction.

16. A processor-implemented mobile payment method, comprising:
generating an OTP key based on a plurality of true random numbers;
determining a first hash value by decrypting, using the OTP key, an encrypted payment data;
generating a second hash value by applying a hash function to the decrypted payment data without a concatenated hash; and
verifying a mobile payment by comparing the first hash value and the second hash value.

17. The method of claim 16, further comprising encrypting and transmitting the generated OTP key.

18. The method of claim 16, further comprising receiving an encrypted payment token,
wherein the encrypted payment token is encrypted based on the transmitted OTP key,
wherein the determining of the first hash value further comprises determining the first hash value by decrypting the encrypted payment token to obtain the decrypted payment data and the first hash value that is uniquely representative of payment data of the mobile payment and for guaranteeing an integrity of the payment data, and
wherein the hash function is a cryptographic hash function, and the generating of the second hash value includes generating the second hash value, using the cryptographic hash function, to be uniquely representative of the decrypted payment data from the decrypted payment data without a concatenated hash.

19. The method of claim 1, wherein the method further comprises generating the payment data for the payment transaction.

20. The method of claim 1, wherein the OTP key is received from the verification device or system or from a portable memory device connected to the electronic device.

* * * * *